Feb. 5, 1963 W. G. WADEY 3,076,473
PROGRAM CONTROL DEVICES FOR FLUID APPARATUS
Filed Aug. 15, 1960 2 Sheets-Sheet 1

INVENTOR
WALTER G. WADEY
BY
ATTORNEY

Feb. 5, 1963 W. G. WADEY 3,076,473
PROGRAM CONTROL DEVICES FOR FLUID APPARATUS
Filed Aug. 15, 1960 2 Sheets-Sheet 2

INVENTOR

WALTER G. WADEY

BY *Benjamin F. Griffin Jr.*

ATTORNEY

United States Patent Office

3,076,473
Patented Feb. 5, 1963

3,076,473
PROGRAM CONTROL DEVICES FOR FLUID APPARATUS
Walter G. Wadey, Wynnewood, Pa., assignor to Sperry Rand Corporation, New York, N.Y., a corporation of Delaware
Filed Aug. 15, 1960, Ser. No. 49,698
8 Claims. (Cl. 137—270)

The present invention relates to means for controlling and varying the internal operations of a fluid apparatus by changing fluid circuits external of the main body of the apparatus to be controlled. More particularly, the present invention provides program control devices for fluid apparatus, said program control devices being quickly and easily interchanged for the purpose of varying the internal operations of the fluid apparatus.

With the advent of the fluid amplifier there has been introduced into the art a whole new family of fluid operated control devices. Since the principles involved in the fluid amplifier are readily adaptable to both digital and analog techniques, computers have been developed wherein the computing functions are carried out by logical circuits which operate on fluid principles. Although the present invention is admirably adapted for use in computer systems, and will be described in a computer environment, it is obvious that it may be used to great advantage in other fluid operated devices.

In computers of the prior art some means is usually provided for changing the internal operations of the computers. Generically speaking, this means is usually called a program device and varies with the type of computer with which it is used. In an electronic computer it may take the form of a large board having a plurality of holes therein. Electrical connectors mounted in these holes extend through the board to the back where, if the board is in position, the contacts make connection with internal circuits of the computer. Electrical wires or jumpers are then inserted into the holes in front of the board to make connection between the various contacts. By varying the arrangement of the jumpers the internal operation of the computer may be changed. The board is usually mounted in such a way that it may be readily removed and replaced with a similar board having different jumper connections in order to provide a completely different mode of operation for the computer. Removal of a complete board is advantageous and results in a great saving of time since the number of connections or jumpers in a single board may number in the hundreds or even thousands. Also, it is desirable to save a particular board and its arrangement since it may be used at some future date.

With the introduction of fluid computers there developed a need for some means for readily changing the internal operation of the computer.

Therefore, it is an object of this invention to provide a means external to a fluid computer for varying the internal operations of the computer.

A further object of this invention is to provide program devices for a fluid computer, said program devices being quickly and easily interchangeable for the purpose of externally changing the connections between fluid channels or conduits which are internal to the computer.

A further object of the invention is to provide interchangeable program blocks having fluid conduit means therein, said program device connecting some of the internal conduits of the fluid apparatus to other internal conduits of the fluid apparatus; and means in the internal conduits of the fluid apparatus for blocking fluid leakage from any conduits which are not connected by the program blocks.

A still further object of the invention is to provide readily interchangeable fluid computer program devices wherein certain operations of the program may be changed without necessarily interchanging entire program blocks. Thus, one embodiment of the invention provides a program block having a plurality of fluid conduits which may be removed and/or rearranged individually.

Further objects will become apparent upon reading the following specification together with the accompanying drawings in which.

Figure 1:
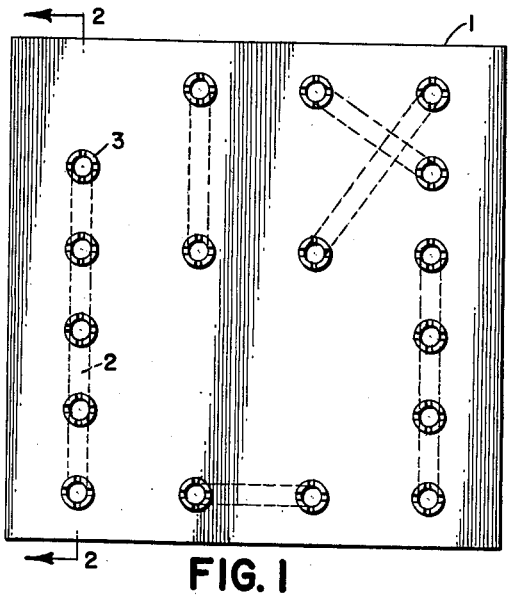
FIGURE 1 is a front view of one embodiment of the invention.
Figures 2, 3:
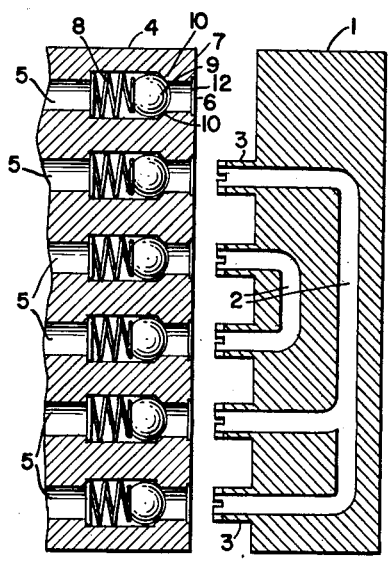
FIGURE 2 is a sectional view of FIGURE 1 taken along the line 2—2.
FIGURE 3 is a sectional view of the main body of the computer and shows the position of the check valves when no program device is in operating position.

Referring to FIGURES 1 and 2, the invention is illustrated as a program block 1 having embedded therein a plurality of channels or conduits 2. At each end of each channel the block 1 is formed to have protrusions 3. The channels extend through these protrusions and terminate at ports in the face of the protrusion. FIGURE 1 shows a program block having a plurality of protrusions arranged in rows and columns. For purposes of illustration, the number of protrusions has been limited it being understood that the number of protrusions depends upon the type of apparatus being controlled and the particular program which the apparatus is to perform. Although the arrangement of the protrusions in rows and columns is the most convenient form, it will be obvious from the following description that the protrusions may be located in any desired position relative to each other provided the arrangement corresponds to the arrangement of control ports in the main body of the apparatus to be programmed.

With the program device of the present invention it is possible to provide connecting channels which cross over each other but do not intersect. This situation is illustrated by the connecting channels which connect the four protrusions in the upper right portion of the program block shown in FIGURE 1. This is made possible by the fact that the program block is of sufficient depth (see FIGURE 2) to permit the connecting channels to be embedded at different levels in the program block without intersecting. Note also that the program block of FIGURE 1 does not have protrusions at the intersection of each row and each column. The number of protrusions present and their location depends upon the type of operation which the computer is to be programmed to perform. The reason for this is made clear by reference to FIGURES 3 and 4 which show a portion of the main body 4 of the computer. Channels 5 are connected to internal elements of the computer. Some of these elements produce fluid output signals which are applied to the channels 5 and others of these internal elements are responsive to fluid signals applied to them over the channels 5. Each of the channels 5 terminates at an opening or port 6 in the surface 7 of the main body. Within each channel 5 is a check valve comprising a spring 8 and a ball 9. When no program block is attached to the computer the check valves are all in the position shown in FIGURE 3 with the balls 9 being forced against the surfaces 10 to prevent leakage of fluid from the computer system.

To utilize the present invention, the program block with its protruding tubes is mated to the main body 4 with the protrusions 3 extending through the ports 6 into the interior of the conduits 5. The program block may be held in operating position by any suitable means (not shown) such as a catch or suitable lock.

Figure 4:
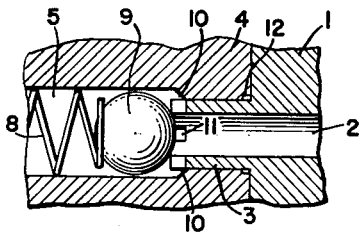
FIGURE 4 is a sectional view showing the position of the check valves when a program block has been placed in operating position against the main body of the computer.

Referring to FIGURE 4, there is shown the detail of one check valve of the main body 4 with a program block 1 in an operative position. The protrusions 3 on the program block are of sufficient length to unseat the ball of the check valve when the program block is in position. Serrations or grooves 11 in the sidewall of the protrusion permit fluid in the channel 5 to flow around the check valve and into the channel 2. In like manner, fluid in the channel 2 may be permitted to flow in the opposite direction around the check valves and into the channel 5. Any suitable means such as O-rings 12 is provided around each port in the main body to prevent leakage of fluid from the system through the space between the protrusion 3 and the main body 4 when the check valve is unseated.

Note that the program block of FIGURE 2 is shown ready for insertion into the main computer body shown in FIGURE 3. It is evident from the explanation given above that when the program block is fully inserted into the main body, connections will be made between several of the fluid channels 5. In the example shown, the two bottom most channels 5 will be connected by means of a first program block channel 2 to the channel 5 which is second from the top. A second channel 2 connects the two center channels 5 to form a second fluid circuit. In the example shown there is no protrusion on the program block for insertion into the top most channel 5 of the main computer body. Thus, the check valve for this channel remains seated to prevent leakage of fluid from the system while the program block is in place.

Figure 5:
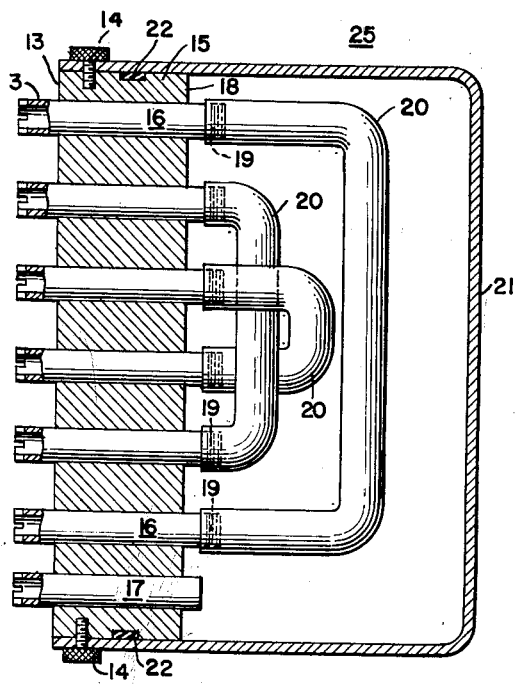
FIGURE 5 is a sectional view of the second embodiment of the invention.

Turning now to FIGURE 5 there is shown a second embodiment of the invention comprising a program block 15 having a plurality of fluid channels 16 passing through it. On one side of block 15 the channels 16 extend beyond the surface 13 and form protrusions similar to the protrusions 3 of FIGURE 2. The channels 16 also extend beyond the surface 18 on the opposite side of the program block for a sufficient distance to allow flexible tubings 20 to be attached to them.

It is obvious that this arrangement provides a program block wherein a portion of the program may be changed by changing the flexible tubing connections on the extensions 19 of the channels 16. In this instance a portion of the program may be changed without inserting an entirely new program block.

Fluid pressures within the system may tend to force the flexible tubing 20 off the extensions 19 of the channels 16. This occurrence may be avoided in several ways. For example, the program block 15 may be provided with one or more special channels 17. The channel 17 is located in the program block in such a manner that when the program block is placed in operating position against the main body of the computer the channel 17 will be connected with a source of high fluid pressure within the computer. A can or pressure tight container 21 is mounted to the program block 15 by thumbscrews 14 or some other means which permits the cover to be readily removed to change the flexible tubing connections. A fluid seal 22 is provided to prevent fluid leakage from the interior of the pressure tight container 21. With this arrangement the pressure within the container 21 acts against the flexible tubing 20 in such a manner as to reduce the tendency of the flexible tubing to become disconnected as a result of fluid pressure applied within the tube.

Figure 6:
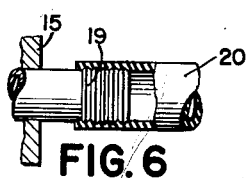
FIGURE 6 is a sectional view showing the details of the tubing of FIGURE 5; and, FIGURE 7 is a pictorial view of an apparatus which utilizes the present invention.

Other or additional means may be provided for preventing accidental disconnection of the flexible tubing. For example, the extensions 19 on the channels 16 may be provided with serrations such as shown in FIGURE 6 to further resist the forces which tend to disconnect the tubing. A further possibility exists if it is not necessary to change the connections of the flexible tubing of FIGURE 5. In this event the pressure tight container may be dispensed with and the flexible tubing embedded in a suitable material such as epoxy resin.

Figure 7:
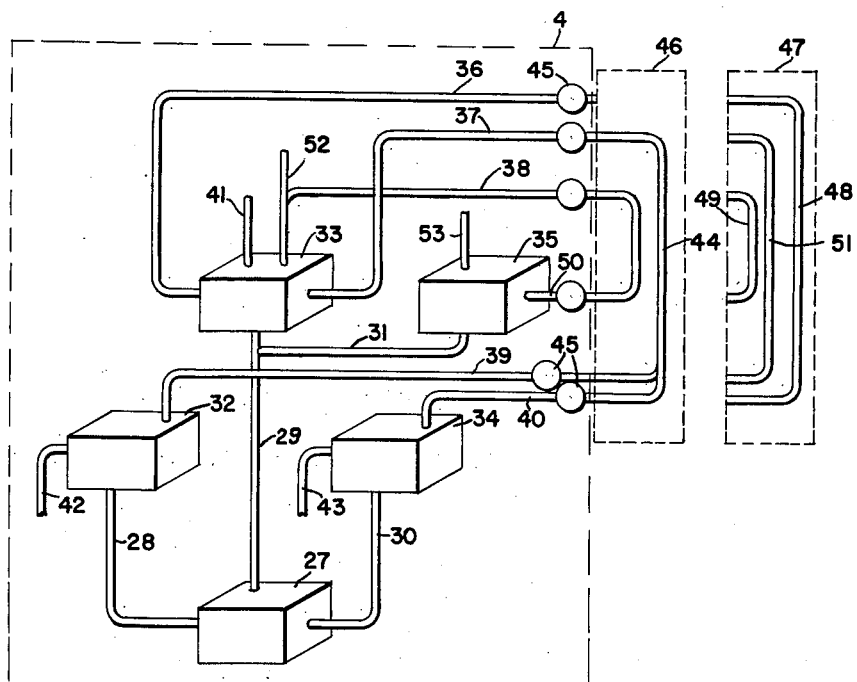

The very simple fluid operated device shown in FIGURE 7 illustrates the utility and advantages of the present invention. A fluid power supply 27 supplies fluid power streams over the conduits 28, 29, 30, and 31 to the power jet input of fluid flip-flop devices 32, 33, 34, and 35. These flip-flops may be of the type shown and described in the April 1960 issue of System Design at page 15. As explained in that publication a fluid flop-flop has a power jet input, right and left control jet inputs, and right and left output channels. A power stream applied to the power jet input of the flip-flop may be directed to the left output by applying a signal to the right control jet. In like manner, a power stream applied to the power jet input may be deflected to the right output by applying a signal to the left control jet. As explained in the above mentioned publication a fluid flip-flop comprises a plurality of channels within a laminated or substantially solid body. In fact it is quite possible that, with the exception of program blocks 46 and 47, all of the elements shown in FIGURE 7 may be contained within a single substantially solid body. It is understood therefore that the conduits such as 28, 29, 30, 36, 37, 38, and so forth shown in FIGURE 7 are not movable relative to each other nor readily rearranged.

Assume for example that it is desired to control the apparatus 4 of FIGURE 7 to produce an output signal on the channel 41 if there is an input signal on either the channel 42 or the channel 43. This can be accomplished by inserting a program block having channels arranged as shown in block 46. With this arrangement a signal applied to channel 42 or 43 will deflect power stream 28 or 30 of the flip-flops 32 or 34 to the right producing signals in channels 39 or 40. These signals pass through check valves 45, channel 44 of the program block, and channel 37 to the right control jet of flip-flop 33. This action deflects the power stream 29 of the flip-flop to the left output channel 41.

On the other hand suppose it is desired to produce output signals on channels 52 and 53 if an input signal is applied to channel 43 but to produce an output on channel 41 if an input signal is applied to channel 42. Assuming the program block is of the type shown in FIGURE 2, the program block 46 would be entirely replaced by the program block 47. On the other hand, if the program block is of the type shown in FIGURE 5, the flexible tubing would be rearranged with different connections. In either event the connecting channels of the program block would provide connections as shown in block 47. Operation of the apparatus 47 would be as follows.

A signal applied to the channel 43 would deflect the power stream 30 of fluid flip-flop 34 to the channel 40 from whence it would pass through the check valve 45, and the channels 48 and 36 to the left hand control jet of the fluid flip-flop 33. This input deflects the power stream 29 to the right output channel 52 and at the same time produces a signal in the channel 38 which passes through the channels 49 and 50 to the right control jet input of the fluid flip-flop 35. This input deflects the control stream 31 to the left producing the desired output signal on channel 53.

On the other hand, assume that a signal is applied on the channel 42 to the left input of the fluid amplifier 32. This input deflects the power stream 28 to the right, producing an output on the channel 39 which passes through check valve 45, channel 51 of the program block, and channel 37 to the right control jet input of the amplifier 33.

This input will deflect the power stream 29 to the left producing the desired output on the channel 41.

The input channels 42 and 43 and the output channels 41, 52 and 53 may be connected to other elements within the main body 4 or connected by suitable means to control some device external of the main body 4.

It is obvious therefore that the present invention provides a means for quickly and easily controlling the internal operations of a fluid operated device without making structural changes within the main body of the device. This is accomplished by attaching to the computer or apparatus to be controlled a program device such as is shown in FIGURES 2 and 5. If it is desired to vary some but not all of the internal operations of the fluid apparatus then a program device such as shown in FIGURE 5 may be used with the internal operations being changed by changing the flexible tubing connections of the program device. Alternatively, several program blocks such as those shown in FIGURES 2 and 5 may be used simultaneous by attaching them to different parts of the main body. This also permits changing of only a portion of the program.

The program blocks 1 and 15 may be made in any one of several ways. The program blocks may for example comprise a plurality of laminations, each lamination being stamped or formed so that when the laminations are assembled, the holes formed by the stamping operation will be aligned to form the channels. Alternatively, the program blocks may be made by forming a plurality of hollow tubes and surrounding them with a suitable material such as plastic or metal.

While the novel features of the invention as applied to preferred embodiments have been shown and described, it will be understood that various omissions and substitutions in the form and details of the devices illustrated may be made by those skilled in the art without departing from the spirit of the invention.

I claim:

1. A program device for controlling the operation of a fluid apparatus, said program device comprising: a program block having a plurality of fluid channels therein where one end of each said fluid channel protrudes from one face of said block and the other end of each said fluid channel protrudes from a second face of said block; a plurality of flexible fluid conducting tubes manually connectable and removable for connecting in any desired configuration the end protrusions at said second face to thereby provide continuous fluid channels between various ones of said end protrusions at said one face; means for providing a pressure-tight space around said connecting fluid conducting tubes; and means for applying pressure to said pressure-tight space.

2. A program device as claimed in claim 1 wherein said means for providing a pressure-tight space comprises a container and means for mounting said container in pressure-tight relation to said program block; and said means for applying pressure to said space includes a further fluid channel extending through said program block.

3. In a program controlled apparatus having a plurality of fluid operated elements within a main body, the improvement comprising: a plurality of channels within said main body for connecting various ones of said elements to ports in a face of said main body, a program block which contains a plurality of fluid channels extending therethrough from ports in a first face to ports in a second face, means for aligning the ports in said main body face with the ports in said program block first face, a plurality of flexible tubes manually connectable and removable for connecting in any desired configuration the ports in said program block second face to thereby provide continuous fluid channels between various ones of the ports in said program block first face; means for providing a pressure-tight space around said fluid connecting means; and means for applying pressure to said pressure-tight space.

4. The improvement according to claim 3 wherein said means for providing a pressure-tight space comprises a container and means for mounting said container in pressure-tight relation to said program block; and said means for applying pressure to said space includes a further fluid channel extending through said program block which is connected to a source of pressure in said main body.

5. The improvement according to claim 3 wherein said aligning means comprises a protrusion surrounding each port in said program block first face such that said protrusion extends into an associated main body channel via its port in said main body face.

6. The improvement according to claim 5 wherein said means for providing a pressure-tight space comprises a container and means for mounting said container in pressure-tight relation to said program block; and said means for applying pressure to said space includes a further fluid channel extending through said program block which is connected to a source of pressure in said main body.

7. In a program controlled apparatus having a plurality of fluid operated elements within a main body, the improvement comprising: a plurality of ports positioned in a desired pattern in a face of said main body; a plurality of fluid conducting channels within said main body for connecting various ones of said elements to said ports; means within each of said channels and adjacent said ports for normally blocking fluid flow through said channels; and removable program control means, said program control means comprising a unitary body having a plurality of protrusions extending from one face thereof in a pattern corresponding at least in part to the pattern of said ports and a further plurality of fluid conducting channels in said unitary body, said further plurality of fluid conducting channels terminating at each end as an opening in one of said protrusions for continuously defining paths for fluid flow between said openings, said protrusions being greater in length than the distance between said ports and said blocking means whereby said protrusions render said blocking means inoperative and fluid may flow between the channels of said main body through the channels of said program control means when said control means is placed in position with said protrusions extending through said ports.

8. In a program controlled apparatus having a plurality of fluid operated elements within a main body, the improvement comprising: a plurality of ports positioned in a desired pattern in a face of said main body; a plurality of fluid conducting channels within said main body for connecting various ones of said elements to said ports; means within each of said channels and adjacent said ports for normally blocking fluid flow through said channels; and removable program control means, said program control means comprising a unitary body having a plurality of protrusions extending from first and second surfaces thereof, said protrusions extending from said first surface being arranged in a pattern corresponding at least in part to the pattern of said ports, said program control means further comprising a further plurality of channels each defining a continuous path for fluid flow through said unitary body and each terminating at one end at an opening in a protrusion extending from said first surface and terminating at the opposite end at an opening in a protrusion in said second surface; and fluid conducting tubing means for selectively interconnecting the protrusions extending from said second surface, the protrusions extending from said first surface being greater in length than the distance between said ports and said blocking means whereby said first protrusions render said blocking means inoperative and fluid may flow between the channels of said main body through said further channels and said fluid conducting tubing means when said control means is placed in position with said protrusions extending through said ports.

References Cited in the file of this patent

UNITED STATES PATENTS

| | | |
|---|---|---|
| 1,899,861 | Gackenbach | Feb. 28, 1933 |
| 2,070,951 | Meldau | Feb. 16, 1937 |
| 2,761,319 | Whitener | Sept. 4, 1956 |
| 2,947,320 | Oxley | Aug. 2, 1960 |

FOREIGN PATENTS

| 789,730 | Great Britain | Jan. 29, 1958 |
|---|---|---|